United States Patent Office 3,199,981 Patented Aug. 10, 1965

3,199,981

LIGHT SENSITIVE LAYERS

Oskar Süs and Erwin Lind, Wiesbaden-Biebrich, Germany, assignors, by mesne assignments, to Azoplate Corporation, Murray Hill, N.J.

No Drawing. Filed July 19, 1960, Ser. No. 43,720
Claims priority, application Germany, July 29, 1959, K 38,316
30 Claims. (Cl. 96—33)

The photomechanical preparation of printing plates using reproduction material having diazo compounds in the light-sensitive coating is known. Benzoquinone diazide and naphthoquinone diazide sulphonic acid esters and amides, have been found commercially useful.

Also, simple diazonium salts of monomolecular basic diazonium compounds have been proposed for the same application, e.g., 1-dimethylamino-benzene-4-diazonium chloride and 1-phenyl-amino-benzene-4-diazonium chloride. However, these compounds have not acquired any practical importance, because the reproduction coatings prepared therewith give printing plates which are not sufficiently resistant to the mechanical stresses to which they are subjected during the printing process and, therefore, give only short runs. Moreover the shelf-life of the light-sensitive material prepared therewith is wholly inadequate for practical purposes.

The present invention relates to reproduction coatings which are designed for the preparation of printing plates and in the preparation of which simple monomolecular diazonium salts are successfully used in readily obtainable modified form as light-sensitive substances. The light-sensitive material in accordance with the invention or the reproduction coatings in accordance with the invention and intended for the preparation of printing plates are characterized in that the light-sensitive coating consists of or contains diazo compounds formed by the reaction of aromatic amino-diazonium salts with water-soluble condensation products of high molecular weight obtained from sulphonated aromatic hydroxyl compounds and formaldehyde, in certain cases in association with alkali-soluble resins.

The reproduction coatings in accordance with the invention have exceptionally good shelf-life and good light sensitivity. Printing plates incorporating the same give long runs.

For the reaction with the aromatic aminodiazonium salts, the tanning substances described in German Patent 262,558 may, for example, be advantageously used, as also condensation products from phenol sulphonic acids, cresol sulphonic acids or naphthol sulphonic acids with formaldehyde, which are commercially available as synthetic tanning agents, also mixed condensation products from naphthalene sulphonic acids or benzyl naphthalene sulphonic acids, phenol and cresol with formaldehyde.

The diazo compounds to be used in reproduction coatings in accordance with the invention, hereinafter also described as precipitation products, have not yet been described in the literature. They are, presumably, sulphonic acid salts of high molecular weight in which the diazo residue acts as the cation.

The starting materials for the preparation of the diazo compounds in accordance with the invention are primarily the para-phenylene diaminodiazonium salts substituted on the nitrogen, e.g., 1-dimethylamino-benzene-4-diazonium chloride,
1-diethylamino-benzene-4-diazonium chloride,
1-phenylamino-benzene-4-diazonium chloride,
1-(4′-bromophenylamino)-benzene-4-diazonium chloride,
1-ethylamino-2-methyl-benzene-4-diazonium chloride,
1-(ethyl-benzyl-amino)-benzene-4-diazonium chloride,
1-(2′,6′-dichlorobenzylamino)-benzene-4-diazonium chloride,
1-benzoylamino-2,5-diethoxy-benzene-4-diazonium chloride,
1-dimethylamino-4,5-dimethyl-benzene-2-diazonium chloride,
1-dimethylamino-4-dimethylamino-sulphonyl-benzene-2-diazonium chloride,
2,5,4′-triethoxy-diphenyl-4-diazoniumhydrogen-sulphate and
carbazole-3-diazonium chloride.

The precipitation products are insoluble in water; they are soluble in organic solvents and it is from such solutions that they are applied to the support. Preferably, 2–5% solutions are used; they are applied to the support for the light-sensitive coating by means of, for example, rollers, brushes, spraying apparatus, whirling devices, or in any other known manner. Examples of suitable solvents are ethylene glycol monomethyl ether, formamide and dimethyl formamide; they are preferably solvents with a boiling point between 90 and 150° C. The use of mixtures of solvents can be advantageous. The coating is well dried in hot air.

The light-sensitive precipitation products are advantageously used in association with resins. This improves the adherence of the coating and increases the mechanical resistance of the printing plate. Phenol-formaldehyde resins and polyepoxide resins are exemplary of suitable resins for use in the formation of the light-sensitive coating.

Metals, in particular aluminum, zinc and copper, and also paper, constitute suitable supporting materials for the light-sensitive coatings in accordance with the invention.

The preparation of printing plates from the reproduction material in accordance with the invention is effected in known manner. The reproduction coating is exposed to light under a master after which the copy produced by the action of light is developed into a printing plate by means of aqueous, alkaline solutions, which may also contain solvents. Aqueous solutions of alkali phosphates and alkali silicates that go into solution with alkaline reaction are very suitable. Positive printing plates are obtained from positive originals. They can be used in planographic printing machines.

Also, blocks, suitable as relief printing plates, can be prepared with the reproduction material in accordance with the invention, if the developed copy is etched in known manner, e.g., with dilute nitric acid.

For the preparation of the light-sensitive precipitation products in accordance with the invention, the following method is advantageously used. 100 parts by volume of an approximately 10% aqueous solution of the water-soluble condensation product of high molecular weight of a sulphonated aromatic hydroxyl compound and formaldehyde are added to 50 parts by volume of a 4% aqueous solution of a p-aminobenzene diazonium compound, whereupon the precipitation products separate out. They are usually amorphous and do not have a definite melting point.

Examples of the light-sensitive diazo compounds by which the reproduction coatings in accordance with the invention are characterized are listed in the following table. The compounds dissolve in ethylene glycol monomethyl ether or dimethyl formamide or in mixtures thereof. They are mostly yellow to brown in color but a few of them have a tinge of green or red:

TABLE.—STARTING MATERIAL

| No. | Diazo compound | Products from which the water-soluble condensation product of high molecular weight is obtained | Color |
|---|---|---|---|
| 1 | 1-dimethylamino-benzene-4-diazonium chloride. | o-Cresolsulfonic acid/formaldehyde, condensed as in Example 1 of DRP 262,558. | Yellow. |
| 2 | 1-diethylamino-benzene-4-diazonium chloride. | do | Do. |
| 3 | 1-phenylamino-benzene-4-diazonium chloride. | Benzylnaphthalene-sulfonic acid/phenol-formaldehyde, condensed as in BIOS Report 762, p. 83. | Do. |
| 4 | 1-(4′-bromo-phenyl-amino)-benzene-4-diazonium chloride. | Naphthalene sulfonic acid/phenol/cresol/formaldehyde, condensed as in BIOS Report 762, p. 85. | Brown. |
| 5 | 1-(2′,6′-dichlorobenzyl-amino)-benzene-4-diazonium chloride. | Phenol/cresol/sulfonic acid/formaldehyde, condensed as in BIOS Report 762, p. 98. | Greenish-yellow. |
| 6 | 2,5,4′-triethoxydiphenyl-4-diazonium hydrogen sulfate. | o-Cresolsulfonic acid/formaldehyde, condensed as in Example 1 DRP 262,558. | Yellow. |
| 7 | 2,5-diethoxy-1-benzoyl-aminobenzene-4-diazonium chloride. | 4,4 -dihydroxydiphenyl-sulfone/formaldehyde, condensed as in BIOS Report 762, p. 73. | Dark yellow. |
| 8 | Carbazole-3-diazonium chloride. | β-Naphtholsulfonic acid/phenolformaldehyde, condensed as in BIOS Report 762, p. 105. | Brown. |
| 9 | 1-(ethyl-benzylamino)-benzene-4-diazonium chloride. | p-Cresolsulfonic acid/formaldehyde, condensed as in DRP 262,558, Example 1. | Yellow. |
| 10 | 1-ethylamino-2-methyl-benzene-4-diazonium chloride. | do | Do. |
| 11 | 1-dimethylamino-4,5-dimethylbenzene-2-diazonium chloride. | do | Orange. |
| 12 | 1-dimethylamino-4-dimentylaminosul-fonylbenzene-2-diazonium chloride. | do | Yellow. |
| 13 | 1-morpholino-2,5-di-butoxy-benzene-4-diazonium chloride. | do | Do. |

The invention will be further illustrated by reference to the following specific examples:

*Example 1*

2 parts by weight of the precipitation product listed in the table above as No. 1, and 2 parts by weight of a phenol-formaldehyde novolak, e.g., the product marketed under the registered trademark Alnovol K429, are dissolved in 100 parts by volume of ethylene glycol monomethyl ether. This solution is whirl-coated upon an aluminum foil, the surface of which has been mechanically roughened. The sensitized foil is dried first in hot air and then for two minutes in a drying oven at 100° C. It is then exposed under a transparent positive master to light, e.g., for 60 seconds to a 15-amp arc lamp at a distance of 70 cm. The exposed foil is developed by wiping down with a 3 percent sodium silicate solution and the surface of the foil, on which there is now a positive image, is treated with an aqueous solution containing 8 percent of dextrin, 1 percent of phosphoric acid and 1 percent of formaldehyde. After the foil has been inked up with greasy ink, it can be used for duplicating purposes in a planographic printing apparatus.

For the preparation of the light-sensitive precipitation product listed in the table as No. 1, 2 parts by weight of 1-dimethylamino-benzene-4-diazonium chloride are dissolved in 50 parts by volume of water. 100 parts by volume are added of an aqueous solution containing 10 percent of a viscous solution of a water-soluble condensation product of o-cresol-sulfonic acid and formaldehyde, prepared as described in Example 1 of German Patent 262,558. A yellow amorphous precipitate is formed which is separated by suction filtration, washed free of acid and dried in vacuo at room temperature. The yellow product obtained after the drying process is readily soluble in ethylene glycol monomethyl ether.

*Example 2*

An aluminum foil, the surface of which has been mechanically roughened, is whirl-coated with a solution containing 2 parts by weight of the precipitation product listed in the table above as No. 2, and 2 parts by weight of the novolak, Alnovol K429, mentioned in Example 1, to 100 parts by volume of ethylene glycol monomethyl ether. The foil is well dried and then exposed under a positive master to the light of an arc lamp. It is developed with a 5 percent sodium silicate solution. A yellow-colored positive image is obtained on bright metal ground. The surface of the foil bearing the image is wiped over with 1 percent phosphoric acid and then inked up with greasy ink. The foil is then ready for printing.

For the preparation of the precipitation product listed in the table as No. 2, the procedure is analogous to that described in Example 1 for the preparation of the precipitation product therein. For 2 parts by weight of the diazo compound dissolved in 50 parts by volume of water, 100 parts by volume are used of an aqueous solution containing 10 percent of a viscous solution of the condensation product of a o-cresolsulfonic acid and formaldehyde, prepared in accordance with the disclosure of Example 1 of German Patent 262,558.

*Example 3*

2 parts by weight of the precipitation product listed in the table above as No. 3 and 3 parts by weight of novolak are dissolved in 100 parts by volume of ethylene glycol monomethyl ether. The solution is whirl-coated upon a roughened aluminum foil and dried in hot air. The coating is exposed under a transparent positive master for 90 seconds to the light of a 15-amp arc lamp. The exposed foil is developed with a 5 percent aqueous trisodium phosphate solution containing up to 15 percent of ethylene glycol monomethyl ether. The positive image obtained, before being inked up with greasy ink, is wiped down with an aqueous solution containing 8 percent of dextrin, 1 percent of phosphoric acid and 1 percent of formaldehyde. After being inked up, the foil is ready for printing.

With the precipitation product used in this case, light-sensitive coatings giving good printing plates can be prepared without any resin additive. Exposure and development are the same as described above.

For the preparation of the precipitation product listed as No. 3 in the table above, 100 parts by volume of an aqueous solution containing 15 percent of a viscous solution of the condensation product of benzyl naphthalene sulfonic acid, phenol and formaldehyde are added to a solution of 2 parts by weight of 1-phenyl-amino-benzene-4-diazonium chloride in 50 parts by volume of water. The yellow precipitation product is separated by suction filtration, washed free of acid and dried in vacuo at room temperature. It is soluble in ethylene glycol monomethyl ether.

For the preparation of the condensation product of benzyl naphthalene sulfonic acid, phenol and formaldehyde used in this example, 490 parts by weight of naphthalene are reacted with 447 parts by weight of benzyl chloride. The reaction product obtained is then sulfonated with 830 parts by weight of oleum. The condensation product of 330 parts by weight of phenol and 223 parts by weight of formaldehyde solution (30%) is added to the benzyl naphthalene sulfonic acid and the reaction mixture is diluted with 845 parts by weight of water. Condensation is continued and for this purpose 132 parts by weight of formaldehyde solution (30%) are added to the reaction mixture. Finally, a viscous solution is obtained which, for the precipitation reaction with the diazo compound, is diluted with water.

With equally good results, the precipitation product listed in the table above as No. 4, which is obtained from 1-(4'-bromophenylamino)-benzene-4-diazonium chloride and the water-soluble condensation product produced from naphthalene sulfonic acid, phenol, cresol and formaldehyde, as described in BIOS Report 762, page 85, may be used instead of the precipitation product listed in the Table as No. 3.

The condensation product from naphthalene sulfonic acid, phenol, cresol and formaldehyde is obtained by a 3-stage reaction. Naphthalene sulfonic acid is first prepared from 130 parts by weight of naphthalene and 219 parts by weight of sulfuric acid monohydrate. This product is condensed with 10 parts by weight of formaldehyde (30%) and also with a condensation product obtained from 25 parts by weight of phenol, 30 parts by weight of phenol oil, 55 parts by weight of cresol and 73 parts by weight of 30% formaldehyde. The viscous aqueous solution of the condensation product is diluted with water and used for the precipitation of the 1-(4'-bromophenylamino)-benzene-4-diazonium chloride.

*Example 4*

An anodically oxidized aluminum foil is coated with a solution which, in 100 parts by volume of ethylene glycol monomethyl ether, contains 3 parts by weight of the precipitation product listed in the table as No. 5, and 1 part by weight of an alkali-soluble resin, the preparation of which is described in detail under Resin A in Example 5 of German patent specification No. 1,053,930, and consists of boiling an alkaline solution of a novolak, e.g., the Alnovol K429 mentioned in Example 1, with chloroacetic acid sodium salt. When the dried foil has been exposed to light under a transparent positive master and developed with a 5 percent aqeuous sodium silicate solution, it gives a positive image of the master. The surface of the foil bearing the image is treated with acid, e.g., with a 0.5 percent aqueous solution of monoammonium phosphate containing 0.01 percent of phosphoric acid and 7 percent of glycerine. It is then inked up with greasy ink.

The product listed as No. 5 in the table above is obtained by the addition to a solution of 2 parts by weight of 1-(2',6'-dichlorobenzylamino)-benzene-4-diazonium chloride in 50 parts by volume of water, of 60 parts by volume of an aqueous solution containing 10 percent of a viscous solution of the condensation product of phenol sulfonic acid, cresol sulfonic acid and formaldehyde, described in BIOS Report 762, page 98, and prepared as follows:

A mixture consisting of 200 parts by weight of cresol and 50 parts by weight of phenol is first sulfonated with 262 parts by weight of 98 percent sulfuric acid. The phenol-cresol-sulfonic acid is then condensed in two stages, first with 250 parts by weight of formaldehyde (30 percent), and then with 96 parts by weight of cresol, 24 parts by weight of phenol and 82 parts by weight of formaldehyde (30 percent). With the viscous solution of the condensation product, the precipitation reaction described above is performed.

*Example 5*

2 parts by weight of the product listed in the table as No. 6 and 2 parts by weight of phenol-formaldehyde novolak are dissolved in 100 parts by volume of ethylene glycol monomethyl ether. This solution is coated upon a mechanically roughened aluminum foil. The foil is thoroughly dried and then exposed under a transparent positive master to the light of an arc lamp. It is developed by sponging down with a 5 percent trisodium phosphate solution containing about 15 percent of ethylene glycol monomethyl ether; a yellow-colored positive image of the master is obtained. After the developed foil has been briefly treated with 1 percent phosphoric acid, the image side is inked up with greasy ink.

For the preparation of the product listed in the table above as No. 6, 2 parts by weight of 2,5,4'-triethoxy-diphenyl-4-diazonium hydrogen sulfate are dissolved in 50 parts by volume of water and then 100 parts by volume are added to an aqueous solution containing 10 percent of a viscous solution of an o-cresol-sulfonic acid/formaldehyde condensation product prepared in accordance with the disclosure of German patent 262,558. The precipitated product is separated by suction filtration, washed free of acid, and dried in vacuo at room temperature.

Instead of the product listed as No. 6 in the table above, the precipitation product listed as No. 9 can be used with equally good results. This is obtained when 100 parts by volume of an aqueous solution containing 10 percent of a viscous solution of a p-cresol-sulfonic acid/formaldehyde condensation product prepared as described in Example 1 of German Patent 262,558, are added to a solution of 2 parts by weight of 1-(ethylbenzylamino)-bnezene-4-diazonium chloride in 50 parts by volume of water. The resin additive in the light-sensitive coating is not absolutely essential. Exposure and development are the same in the case of a coating without resin as in one with resin.

*Example 6*

A paper printing foil prepared in accordance with the disclosure of U.S. Patent 2,534,588, which has been provided on one side wtih a coating of casein and clay hardened wtih formaldehyde, is coated on that side with a solution containing 3 parts by weight of the precipitation product listed as No. 7 in the table above and 1 part by weight of a polyepoxide resin, e.g., 1 g. of the product marketed under the registered trademark Cellobond Epoxy Resin BX 2100, to each 100 parts by volume of a 4:1 mixture of ethylene glycol monomethyl ether and dimethyl formamide. The coated and dried foil is exposed to light behind a transparent positive master and a positive image of the master is obtained. It is developed by sponging down with a 0.125 percent trisodium phosphate solution. The foil is then treated with an aqueous solution containing 0.2 percent of monoammonium phosphate, 0.01 percent of phosphoric acid and 5.1 percent of glycerine. The surface of the foil bearing the image is inked up with greasy ink and used as a printing plate.

The light-sensitive precipitation product listed as No. 7 in the table above is obtained when 2 parts by weight of 2,5-diethoxy-1-benzoylamino-benzene-4-diazonium chloride are dissolved in 50 parts by volume of water, and 50 parts by volume of an aqueous solution containing 20 percent of a viscous solution of the condensation product, which in this case is a sulfonate, obtained by the condensation of phenol, sulfuric acid, formaldehyde and sodium sulfite (cf., preparation instructions given in BIOS Report 762, pages 73 and 26, respectively) are added.

*Example 7*

A solution consisting of 2 parts by weight of the light-sensitive product listed as No. 8 in the table above and 2 parts by weight of novolak in 100 parts by volume of dimethyl formamide, is whirl-coated upon a mechanically roughened aluminum foil. The foil is dried for about 2 minutes at 100° C. until the solvent has been completely removed. The light-sensitive coating thus produced is exposed to light behind a transparent master for about 90 seconds and the exposed coating is then developed with a 4 percent sodium silicate solution. The side of the foil bearing the yellow-colored positive image thus obtained is wiped over with an aqueous solution containing 8 percent of dextrin, 1 percent of phosphoric acid and 1 percent of formaldehyde. After being inked up with greasy ink, it is used as a printing surface.

For the preparation of the product listed in the table above as No. 8, 2 parts by weight of carbazole-3-diazonium chloride are dissolved in 50 parts by volume of water. To this solution, 60 parts by volume are added of an aqueous solution containing 10 percent of a viscous solution of a condensation product, for the preparation of which 640 parts by weight of β-naphthol are sulfonated with 540 parts by weight of sulfuric acid and then condensed with 650 parts by weight of phenol and 620 parts by weight of a 30 percent formaldehyde solution (cf., BIOS Report No. 762, page 105).

Instead of the precipitation product listed in the table above as No. 8, the light-sensitive product listed as No. 11 may be used with equally good results. This is obtained if a solution consisting of 2 parts by weight of 1-dimethylamino-4,5-dimethyl-benzene-2-diazonium chloride in 50 parts by volume of water is mixed with 100 parts by volume of an aqueous solution containing 10 percent of a viscous solution of a condensation product prepared from p-cresol sulfonic acid and formaldehyde in accordance with the disclosure of Example 1 of German Patent 262,558.

*Example 8*

2 parts by weight of the precipitation product listed in the table above as No. 2 (see Example 2 for preparation) and 4 parts by weight of novolak are dissolved in 100 parts by volume of ethylene glycol monomethyl ether. The solution is coated upon a zinc plate, which has been roughened by etching with 10 percent nitric acid. After the sensitized plate has been dried in hot air and then in a drying oven, it is exposed to light under a transparent positive master for 90 seconds. For development, the exposed plate is sponged down with a 5 percent sodium silicate solution and pre-etched with 3 percent nitric acid. Finally, immersion in 7 percent nitric acid will produce an etched block suitable for relief printing, e.g., for books.

*Example 9*

A brightly polished copper plate is coated with a solution of 2 parts by weight of the precipitation product listed in the table above as No. 10 and 2 parts by weight of phenol-formaldehyde novolak in 100 parts by volume of ethylene glycol monomethyl ether. After the coating has been dried, first in hot air and then in a drying oven (2 minutes at 100° C.), it is exposed under a negative film master and developed with a 5 percent sodium silicate solution. If the developed copper plate is immersed in a 35 percent iron-trichloride solution, an etched block will be obtained after 20–30 minutes which is very suitable for relief printing. Precipitation product No. 10 in the table above is obtained if 100 parts by volume of an aqueous solution containing 10 percent of a viscous solution of a p-cresol-sulfonic acid/formaldehyde condensation product, prepared in accordance with the disclosure of Example 1 of German Patent 262,558 are introduced into a solution of 2 parts by weight of 1-ethylamino-2-methylbenzene-4-diazonium chloride in 50 parts by volume of water. Instead of the precipitation product listed as No. 10 in the table, No. 12 can be used with equally good results. This is obtained by the introduction of 100 parts by volume of an aqueous solution containing 10 percent of a viscous solution of the p-cresol-sulfonic acid and formaldehyde condensation product mentioned above into a solution of 2 parts by weight of 1-dimethylamino - 4 - dimethylamino-sulfonyl-benzene-2-diazonium chloride in 50 parts by volume of water.

*Example 10*

2 parts by weight of the precipitation product listed in the table above as No. 13 and 3 parts by weight of phenol-formaldehyde novolak, e.g., 3 parts by weight of the novolak Alnovol K429 mentioned in Example 1, are dissolved in 100 parts by volume of ethylene glycol monomethyl ether. This solution is whirl-coated upon an aluminum foil, the surface of which had been mechanically roughened. After the light-sensitive coating has been dried in hot air, the foil is exposed to light under a transparent positive master. The exposed foil is developed by sponging down with an 8.5 percent sodium silicate solution. After development, the surface of the foil is wiped over with 1 percent phosphoric acid and inked up with greasy ink. The positive printing plate obtained is used for printing in a planographic apparatus.

For the preparation of precipitation product No. 13, 2 parts by weight of 1-morpholino-2,5-dibutoxy-benzene-4-diazonium chloride are dissolved in 50 parts by volume of water and precipitated with 100 parts by volume of an aqueous solution containing 10 percent of a viscous solution of the condensation product prepared from p-cresol-sulfonic acid and formaldehyde, as described in Example 1 of German Patent 262,558.

The 1-morpholino-2,5-di-n-butoxy-benzene-4-diazonium chloride is prepared as follows: the 4-chloro-1-nitrohydroquinone-di-n-butylether (M.P. 81–82° C.) is obtained from chlorohydroquinone-di-n-butylether by nitrosation with aqueous nitric acid. When this compound is boiled with aqueous morpholine, the 4-nitro-2,5-di-n-butoxy-phenylmorpholine (M.P. 101–102° C.) is formed.

Reduction and diazotization are carried out in known manner. The diazo compound is precipitated in the form of the zinc chloride double salt.

It will be obvious to those skilled in the art that many modifications may be made within the scope of the present invention without departing from the spirit thereof, and the invention includes all such modifications.

What is claimed is:

1. A presensitized printing plate comprising a base material having a thin, uniform coating thereon comprising a compound prepared by reacting an aromatic amino diazonium salt with a high molecular weight condensation product selected from the group consisting of a condensation product of a sulfonated aromatic hydoxy compound and formaldehyde and a condensation product of an aryl sulfonic acid, an aromatic hydroxyl compound and formaldehyde.

2. A process for making a printing plate which comprises exposing a coated base material to light under a master, the coating comprising a compound prepared by reacting an aromatic amino diazonium salt with a high molecular weight condensation selected from the group consisting of a condensation product of a sulfonated aromatic hydroxy compound and formaldehyde and a condensation product of an aryl sulfonic acid, an aromatic hydroxyl compound and formaldehyde, and treating the exposed coating with an aqueous alkaline developing solution.

3. A presensitized printing plate comprising a base material having a coating thereon comprising a thin, uniform compound prepared by reacting 1-dimethylamino-benzene-4-diazonium chloride with a high molecular weight condensation product of o-cresolsulfonic acid and formaldehyde.

4. A presensitized printing plate comprising a base material having a coating thereon comprising a thin, uniform compound prepared by reacting 1-diethylamino-benzene-4-diazonium chloride with a high molecular weight condensation product of o-cresolsulfonic acid and formaldehyde.

5. A presensitized printing plate comprising a base material having a coating thereon comprising a thin, uniform compound prepared by reacting 1-phenylamino-benzene-4-diazonium chloride with a high molecular weight condensation product of benzylnaphthalene sulfonic acid and phenol-formaldehyde.

6. A presensitized printing plate comprising a base material having a coating thereon comprising a thin, uniform compound prepared by reacting 1-(4′-bromo-phenylamino)-benzene-4-diazonium chloride with a high molecular weight condensation product of naphthalene sulfonic acid, phenol, cresol and formaldehyde.

7. A presensitized printing plate comprising a base material having a coating thereon comprising a thin, uniform compound prepared by reacting 1-(2′,6′-dichlorobenzylamino)-benzene-4-diazonium chloride with a high molecular weight condensation product of phenol and cresol sulfonic acids and formaldehyde.

8. A presensitized printing plate comprising a base material having a coating thereon comprising a thin, uniform compound prepared by reacting 2,5,4′-triethoxy-diphenyl-4-diazonium hydrogen sulfate with a high molecular weight condensation product of o-cresolsulfonic acid and formaldehyde.

9. A presensitized printing plate comprising a base material having a coating thereon comprising a thin, uniform compound prepared by reacting 2,5-diethoxy-1-benzoylamino-benzene-4-diazonium chloride with a high molecular weight condensation product of 4,4′-dihydroxydiphenyl sulfone and formaldehyde.

10. A presensitized printing plate comprising a base material having a coating thereon comprising a thin, uniform compound prepared by reacting carbazole-3-diazonium chloride with a high molecular weight condensation product of β-naphtholsulfonic acid and phenol-formaldehyde.

11. A presensitized printing plate comprising a base material having a coating thereon comprising a thin, uniform compound prepared by reacting 1-dimethylamino-4,5-dimethyl-benzene-2-diazonium chloride with a high molecular weight condensation product of p-cresolsulfonic acid and formaldehyde.

12. A presensitized printing plate comprising a base material having a coating thereon comprising a thin, uniform compound prepared by reacting 1-ethylamino-2-methylbenzene-4-diazonium chloride with a high molecular weight condensation product of p-cresolsulfonic acid and formaldehyde.

13. A presensitized printing plate comprising a base material having a coating therton comprising a thin, uniform compound prepared by reacting 1-dimethylamino-4-dimethylamino sulfonyl benzene-2-diazonium chloride with a high molecular weight condensation product of p-cresolsulfonic acid and formaldehyde.

14. A presensitized printing plate comprising a base material having a coating thereon comprising a thin, uniform compound prepared by reacting 1-morpholino-2,5-dibutoxy-benzene-4-diazonium chloride with a high molecular weight condensation product of p-cresolsulfonic acid and formaldehyde.

15. A presensitized printing plate according to claim 1 in which the coating includes an alkali-soluble resin.

16. A process for making a printing plate which comprises exposing a coated base material to light under a master, the coating comprising a compound prepared by reacting 1-dimethylamino-benzene-4-diazonium chloride with a high molecular weight condensation product of o-cresolsulfonic acid and formaldehyde, and treating the exposed coating with an aqueous alkaline developing solution.

17. A process for making a printing plate which comprises exposing a coated base material to light under a master, the coating comprising a compound prepared by reacting 1-diethylamino-benzene-4-diazonium chloride with a high molecular weight condensation product of o-cresolsulfonic acid and formaldehyde, and treating the exposed coating with an aqueous alkaline developing solution.

18. A process for making a printing plate which comprises exposing a coated base material to light under a master, the coating comprising a compound prepared by reacting 1-phenylamino-benzene-4-diazonium chloride with a high molecular weight condensation product of benzylnaphthalene sulfonic acid and phenol-formaldehyde, and treating the exposed coating with an aqueous alkaline developing solution.

19. A process for making a printing plate which comprises exposing a coated base material to light under a master, the coating comprising a compound prepared by reacting 1-(4′-bromophenylamino)-benzene-4-diazonium chloride with a high molecular weight condensation product of naphthalene sulfonic acid, phenol, cresol and formaldehyde, and treating the exposed coating with an aqueous alkaline developing solution.

20. A process for making a printing plate which comprises exposing a coated base material to light under a master, the coating comprising a compound prepared by reacting 1-(2′,6′-dichlorbenzylamino)-benzene-4-diazonium chloride with a high molecular weight condensation product of phenol and cresol sulfonic acids and formaldehyde, and treating the exposed coating with an aqueous alkaline developing solution.

21. A process for making a printing plate which comprises exposing a coated base material to light under a master, the coating comprising a compound prepared by reacting 2,5,4′-triethoxy-diphenyl-4-diazonium hydrogen sulfate with a high molecular weight condensation product of o-cresolsulfonic acid and formaldehyde, and treating the exposed coating with an aqueous alkaline developing solution.

22. A process for making a printing plate which comprises exposing a coated base material to light under a master, the coating comprising a compound prepared by reacting 2,5-diethoxy-1-benzoylamino-benzene-4-diazonium chloride with a high molecular weight condensation product of 4,4′-dihydroxydiphenyl sulfone and formaldehyde, and treating the exposed coating with an aqueous alkaline developing solution.

23. A process for making a printing plate which comprises exposing a coated base material to light under a master, the coating comprising a compound prepared by reacting carbazole-3-diazonium chloride with a high molecular weight condensation product of β-naphtholsulfonic acid and phenol-formaldehyde, and treating the exposed coating with an aqueous alkaline developing solution.

24. A process for making a printing plate which comprises exposing a coated base material to light under a master, the coating comprising a compound prepared by reacting 1 - ethylamino - 2 - methylbenzene-4-diazonium chloride with a high molecular weight condensation product of p-cresolsulfonic acid and formaldehyde, and treating the exposed coating with an aqueous alkaline developing solution.

25. A process for making a printing plate which comprises exposing a coated base material to light under a master, the coating comprising a compound prepared by reacting 1-ethylamino-2-methylbenzene- 4-diazonium chloride with a high molecular weight condensation product of p-cresolsulfonic acid and formaldehyde, and treating the exposed coating with an aqueous alkaline developing solution.

26. A process for making a printing plate which comprises exposing a coated base material to light under a master, the coating comprising a compound prepared by reacting 1-dimethylamino-4-dimethylamino sulfonyl benzene-2-diazonium chloride with a high molecular weight condensation product of p-cresolsulfonic acid and formaldehyde, and treating the exposed coating with an aqueous alkaline developing solution.

27. A process for making a printing plate which comprises exposing a coated base material to light under a master, the cooating comprising a compound prepared by reacting 1-morpholino-2,5-dibutoxy-benzene-4-diazonium chloride with a high molecular weight condensation product of p-cresolsulfonic acid and formaldehyde, and treating the exposed coating with an aqueous alkaline developing solution.

28. A process according to claim 2 in which the coating includes an alkali-soluble resin.

29. A presensitized printing plate comprising a base material having a coating thereon comprising a thin, uniform compound prepared by reacting 1-(ethyl-benzylamino)-benzene-4-diazonium chloride with a high molecular weight condensation product of p-cresol sulfonic acid and formaldehyde.

30. A process for making a printing plate which comprises exposing a coated base material to light under a master, the coating comprising a compound prepared by reacting 1-(ethyl-benzylamino)-benzene-4-diazonium chloride with a high molecular weight condensation product of p-cresol sulfonic acid and formaldehyde, and treating the exposed coating with an aqueous alkaline developing solution.

References Cited by the Examiner

UNITED STATES PATENTS

| | | | |
|---|---|---|---|
| 2,541,727 | 2/51 | Von Glahn et al. | 96—91 |
| 2,679,498 | 5/54 | Seven et al. | 260—141 |
| 3,028,240 | 4/62 | Werner et al. | 96—91 |
| 3,046,120 | 7/62 | Schmidt et al. | 96—33 |
| 3,050,387 | 8/62 | Neugebauer et al. | 96—49 X |

FOREIGN PATENTS

| | | |
|---|---|---|
| 262,558 | 7/13 | Germany. |

NORMAN G. TORCHIN, *Primary Examiner.*

PHILIP E. MANGAN, *Examiner.*

UNITED STATES PATENT OFFICE
CERTIFICATE OF CORRECTION

Patent No. 3,199,981 August 10, 1965

Oskar Süs et al.

It is hereby certified that error appears in the above numbered patent requiring correction and that the said Letters Patent should read as corrected below.

Column 6, line 33, for "bnezene-" read -- benzene- --; column 8, line 57, after "condensation" insert -- product --; column 9, line 50, for "therton" read -- thereon --; column 10, lines 53 and 54, for "1-ethylamino-2-methylbenzene-4-diazonium" read -- 1-dimethylamino-4,5-dimethylbenzene-2-diazonium --; column 12, lines 3 and 4, for "soslution" read -- solution --.

Signed and sealed this 25th day of January 1966.

(SEAL)
Attest:

ERNEST W. SWIDER
Attesting Officer

EDWARD J. BRENNER
Commissioner of Patents